(12) United States Patent
Van Liere

(10) Patent No.: US 7,559,289 B2
(45) Date of Patent: Jul. 14, 2009

(54) METHOD OF AND AN INSTALLATION FOR MILKING AN ANIMAL HAVING AT LEAST TWO TEATS

(75) Inventor: Marinus Hubrecht Van Liere, Kloetinge (NL)

(73) Assignee: Lely Enterprises AG, Zuq (CH)

( * ) Notice: Subject to any disclaimer, the term of this patent is extended or adjusted under 35 U.S.C. 154(b) by 0 days.

(21) Appl. No.: 12/143,936

(22) Filed: Jun. 23, 2008

(65) Prior Publication Data

US 2008/0257266 A1    Oct. 23, 2008

Related U.S. Application Data

(63) Continuation of application No. PCT/NL2006/000607, filed on Dec. 4, 2006.

(51) Int. Cl.
*A01K 5/02* (2006.01)
(52) U.S. Cl. .................................... 119/14.02
(58) Field of Classification Search .............. 119/14.02, 119/14.03, 14.18, 14.38
See application file for complete search history.

(56) References Cited

U.S. PATENT DOCUMENTS

| 4,011,838 | A | * | 3/1977 | Nordegren et al. | ....... 119/14.08 |
| 4,190,021 | A | * | 2/1980 | Reisgies | ................. 119/14.44 |
| 4,790,261 | A | * | 12/1988 | Wartenhorst | ............. 119/14.02 |
| 5,769,024 | A | * | 6/1998 | Ornerfors et al. | ........ 119/14.02 |
| 5,979,358 | A | * | 11/1999 | Ornerfors et al. | ........ 119/14.02 |
| 7,162,970 | B2 | * | 1/2007 | Maier, Jr. | .................. 119/14.18 |
| 7,258,074 | B2 | * | 8/2007 | Ebeling et al. | ........... 119/14.02 |
| 2003/0111017 | A1 | | 6/2003 | Wartenhorst | |
| 2003/0226506 | A1 | | 12/2003 | van den Berg | |
| 2004/0168646 | A1 | | 9/2004 | Maier, Jr. | |

FOREIGN PATENT DOCUMENTS

EP    1369029 A2    12/2003

* cited by examiner

*Primary Examiner*—Yvonne R. Abbott
(74) *Attorney, Agent, or Firm*—David P. Owen; Howrey LLP-EU

(57) ABSTRACT

A method of milking an animal having at least two teats. The method comprises a stimulation phase in which the teats of the animal are stimulated and a milking phase in which the animal is milked. The method comprises the steps of applying a stimulation phase and a milking phase to one of the teats of the animal and applying substantially only a milking phase to at least one of the other teats of the animal. The method further comprises a determination phase in which the teat with the shortest period of time in which the teat is milked out is determined, the stimulation phase and the milking phase being applied to the animal's teat with the shortest period of time, and the milking phase being applied substantially only to at least one of the other teats of the animal.

20 Claims, No Drawings

METHOD OF AND AN INSTALLATION FOR MILKING AN ANIMAL HAVING AT LEAST TWO TEATS

CROSS REFERENCE TO RELATED APPLICATIONS

This application is a continuation of International Application No. PCT/NL2006/000607 filed on Jun. 21, 2006, which was published under PCT Article 21(2) in English, the contents of which are hereby incorporated by reference in their entirety.

BACKGROUND OF THE INVENTION

1. Field of the Invention

The invention relates to methods of milking animals and in particular to methods including a stimulation phase in which the teats of the animal are stimulated and a milking phase in which the animal is milked. The invention also relates to an installation for performing such stimulation and milking.

2. Description of the Related Art

Methods of stimulating and milking are known per se, see EP-A-1 369 029 and US publication 2003/226506, the contents of which are hereby incorporated by reference in their entirety. In the method disclosed therein it is ensured that teats with long periods of time, i.e. teats needing more time for being milked-out, will be stimulated longer or at a higher frequency.

It is an object of the invention to provide an alternative method of milking.

BRIEF SUMMARY OF THE INVENTION

This object is achieved according to the invention by a method comprising the features of applying a stimulation phase and a milking phase to a number of the teats of the animal, which number is smaller than the total number of teats of said animal and greater than or equal to one, and applying substantially only a milking phase to at least one of the other teats of the animal. The invention is based on the insight that the known method has drawbacks owing to the fact that longer stimulation times are used. The total time needed for milking the animal thus increases unnecessarily. By stimulating at a higher frequency the teat in question is unnecessarily loaded and this may lead to inconvenience for the animal. According to the invention, by substantially only milking the teat with the longest milking-out period, and consequently not stimulating said teat or stimulating it considerably less long than the other teats, it is ensured that, by stimulating at least one of the other teats, there will be formed in the animal hormones promoting the milk production of the animal for all the teats, whereas the teat with the longest period of time, i.e. the slowest milking teat, will not be unnecessarily loaded by stimulation, and a relatively short total milking time will still be obtained. Determination of the (longest) period of time takes place, for example, during a previous milking of the animal, said period of time being used in a subsequent milking to decide whether a teat will be substantially only milked or will be stimulated and milked. Data relating to the milking-out period may be stored per teat and per animal in a suitable memory. The data may be recovered on the basis of an animal identification device such as a tag or the like.

If the method is applied to an animal having four teats, the teat with the shortest period of time in which the teat is milked out is preferably determined in the determination phase, the stimulation phase and the milking phase being applied to the teat with the shortest period of time. In this case of an animal having four teats, the difference between the periods of time of each of the two other teats and the value of the period of time of the teat with the shortest or longest period of time are preferably determined, each difference being compared with a threshold value and, in dependence on the result of the comparison, it is decided whether the relevant other teat will be subjected to a stimulation phase and a milking phase or substantially only to a milking phase. Said threshold value, which may be a percentage, a fixed value or a variable, adjustable value, thus ensures that the other teats or one of the other teats will be both stimulated and milked.

The invention is also based on the insight that, besides the period of time, other parameters may also be used to decide whether at least one of the teats will substantially only be milked, whereas the other eats will be stimulated and milked. Such a parameter may be, for example, the sensitivity of the teat to stimulation. The invention thus relates in general to a method of milking an animal having at least two teats, the method comprising a stimulation phase in which the teats of the animal are stimulated, and a milking phase in which the animal is milked, wherein the method comprises the steps of applying a stimulation phase and a milking phase to one of the teats of the animal, and applying substantially only a milking phase to at least one of the other teats of the animal.

If this method is applied to an animal having four teats, the method preferably comprises the steps of applying a stimulation phase and a milking phase to a number of teats of the animal, which number is smaller than four and greater than or equal to one, and applying substantially only a milking phase to the other teats of the animal.

It is advantageous if milking takes place by connecting a teat cup to a respective teat, the stimulation phase being applied at least to the teat that is connected first. It is known that the hormone secreted upon stimulation of a teat has an effect on all the teats. In this manner the milk production of teats not yet connected is already stimulated at the first milking action.

It is further advantageous if the teat to which the stimulation phase is applied alternates after a number of milkings according to a particular routine. In this manner it is prevented that a teat will be irritated or even damaged by too much stimulation. Alternating can take place at random or in a particular sequence. Alternating can be limited to only between the rear quarters, because these are usually connected prior to the front quarters. Alternating can take place after a particular period of time has elapsed but preferably takes place after one or more milkings.

The invention also relates to an installation for milking an animal having at least two teats, the installation comprising a stimulation device for stimulating the teats of the animal, a milking device for milking the animal, and a control arrangement for controlling the operation of the stimulation device and the milking device, wherein the control arrangement is designed to control the stimulation device and the milking device in such a way that one of the teats of the animal will be stimulated and milked, and in that at least one of the other teats of the animal will substantially only be milked. Since such an installation is known from EP A 1,369,029, the science related thereto being included in the present document by reference, it will be easy for a person skilled in the art to program the control device disclosed therein, for example a computer, or to provide it with a comparison arrangement known per se, in such a way that it will be possible to put the inventive features (also in conformity with the embodiments described hereinafter) into practice. Consequently, a more detailed description of the installation is considered superfluous.

The installation is preferably suitable for milking an animal having four teats, the control arrangement being designed to control the stimulation device and the milking device in such a way that a number of teats of the animal will be stimulated and milked, which number is smaller than four and greater than or equal to one, and that the other teats of the animal will all be milked.

The installation further comprises in an advantageous manner a determination arrangement for determining the teat with the longest period of time in which the teat is milked out, the control arrangement being designed to control the stimulation device and the milking device in such a way that the teat of the animal with the longest period of time will substantially only be milked, and that at least one of the other teats of the animal will be stimulated and milked. In this case, the determination arrangement is preferably suitable for determining the teat with the shortest period of time in which the teat is milked out, the control device being designed to control the stimulation device and the milking device in such a way that the teat with the shortest period of time will be stimulated and milked. The determination arrangement is then in particular suitable for determining the difference between the periods of time of each of the two other teats and the value of the period of time of the teat with the shortest or longest period of time, the installation being provided with a comparison device for comparing each difference with a threshold value and for supplying a comparison signal representing said difference, the control device controlling, in dependence on the comparison signal, the stimulation device and the milking device for each other teat in such a way that the relevant other teat will be stimulated and milked, or will substantially only be milked.

In a favorable embodiment, the installation comprises teat cups that are connectable to a teat. Both milking and stimulation may be performed by the teat cups. Alternatively, stimulation may be provided by other means including rollers, brushes, jets, vibratory devices and the like. The control device may control the stimulation device and the milking device in such a way that at least the first teat connected will be stimulated and milked. It is further advantageous if the control device comprise a routine that controls the stimulation device in an alternating manner after one or more milkings. By controlling in an alternating manner is meant that after a number of milkings another teat is stimulated. Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of milking an animal having at least two teats, the method comprising:
    a stimulation phase in which at least one of the teats of the animal is stimulated; and
    a milking phase in which the animal is milked;
    wherein the method comprises:
    applying a stimulation phase and a milking phase to one of the teats of the animal, and
    applying substantially only a milking phase to at least one of the other teats of the animal.

2. A method as claimed in claim 1, wherein the method is applied to an animal having four teats, the method comprising the steps of applying a stimulation phase and a milking phase to a number of teats of the animal, which number is smaller than four and greater than or equal to one, and
    applying substantially only a milking phase to the other teats of the animal.

3. A method as claimed in claim 1, wherein the method further comprises:
    a determination phase in which the teat with the longest period of time in which the teat is milked out is determined, substantially only the milking phase being applied to the animal's teat with the longest period of time, and
    the stimulation phase and the milking phase being applied to at least one of the other teats of the animal.

4. A method as claimed in claim 3, wherein, in the determination phase, the teat with the shortest period of time in which the teat is milked out is determined, the method being applied to an animal having four teats, the stimulation phase and the milking phase being applied to the teat with the shortest period of time.

5. A method as claimed in claim 4, wherein the difference between the periods of time of each of the two other teats and the value of the period of time of the teat with the shortest or longest period of time are determined, each difference being compared with a threshold value and, in dependence on the result of the comparison, it being decided whether the relevant other teat will be subjected to a stimulation phase and a milking phase or substantially only to a milking phase.

6. A method as claimed in claim 1, wherein milking takes place by connecting a teat cup to a respective teat, and in that the stimulation phase is applied at least to the teat that is connected first.

7. A method as claimed in claim 1, wherein the at least one teat to which the stimulation phase is applied alternates according to a particular routine after a number of milkings.

8. An installation for milking an animal having at least two teats, the installation comprising:
    a stimulation device for stimulating the teats of the animal,
    a milking device for milking the animal, and
    a control arrangement for controlling the operation of the stimulation device and the milking device,
    wherein the control arrangement is arranged to control the stimulation device and the milking device in such a way that one of the teats of the animal will be stimulated and milked, and in that at least one of the other teats of the animal will substantially only be milked.

9. An installation as claimed in claim 8, wherein the installation is arranged for milking an animal having four teats, the control arrangement being designed to control the stimulation device and the milking device in such a way that a number of teats of the animal will be stimulated and milked, which number is smaller than four and greater than or equal to one, and in that all the other teats of the animal will be milked.

10. An installation as claimed in claim 8, wherein the installation further comprises a determination arrangement for determining the teat with the longest period of time in which the teat is milked out, the control arrangement being designed to control the stimulation device and the milking device in such a way that the teat of the animal with the longest period of time will substantially only be milked, and that at least one of the other teats of the animal will be stimulated and milked.

11. An installation as claimed in claim 10, wherein the determination arrangement is suitable for determining the teat with the shortest period of time in which the teat is milked out, the control arrangement being designed to control the stimulation device and the milking device in such a way that the teat with the shortest period of time will be stimulated and milked.

12. An installation as claimed in claim 11, wherein the determination arrangement is suitable for determining the difference between the periods of time of each of the two other teats and the value of the period of time of the teat with the shortest or longest period of time, in that the installation is provided with a comparison device for comparing each difference with a threshold value and for supplying a comparison signal representing said difference, the control arrangement controlling, in dependence on the comparison signal, the stimulation device and the milking device for each other teat in such a way that the relevant other teat will be stimulated and milked, or will substantially only be milked.

13. An installation as claimed in claim 8, wherein the installation comprises teat cups that are connectable to a teat, the control arrangement controlling the stimulation device and the milking device in such a way that at least the first teat connected will be stimulated and milked.

14. An installation as claimed in claim 8, wherein the control arrangement comprises a routine that controls the stimulation device in an alternating manner after one or more milkings.

15. In a robotic milking installation, a method of milking an animal having a plurality of teats, the method comprising:
   determining a teat having the longest milking-out time;
   commencing a milking phase for the teat having the longest milking-out time;
   stimulating at least one other teat of the animal during said milking phase.

16. A method as claimed in claim 15, wherein the method is applied to an animal having four teats, the method comprising the steps of applying a stimulation phase and a milking phase to a number of teats of the animal, which number is smaller than four and greater than or equal to one, and
   applying substantially only a milking phase to the other teats of the animal.

17. A method as claimed in claim 15, further comprising determining a teat with the shortest milking-out time is determined, wherein a stimulation phase and a milking phase is applied to the teat with the shortest period of time.

18. A method as claimed in claim 17, wherein the animal has four teats and a difference between the milking-out time of each of two other teats and the value of the milking-out time of the teat with the shortest or longest period of time are determined, each difference being compared with a threshold value and, in dependence on the result of the comparison, it is decided whether the relevant other teat will be subjected to a stimulation phase and a milking phase or substantially only to a milking phase.

19. A method as claimed in claim 15, wherein milking takes place by connecting a teat cup to a respective teat, and in that stimulation is applied at least to a teat that is connected first.

20. A method as claimed in claim 15, wherein the at least one teat to which the stimulation is applied alternates according to a particular routine after a number of milkings.

* * * * *